(12) United States Patent
Klassen et al.

(10) Patent No.: US 9,668,092 B2
(45) Date of Patent: May 30, 2017

(54) VISUAL REPRESENTATION OF CONTACT LOCATION

(71) Applicant: BlackBerry Limited, Waterloo (CA)

(72) Inventors: Gerhard Dietrich Klassen, Waterloo (CA); Shaul S. Wisebourt, Waterloo (CA); Samer Fahmy, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/870,355

(22) Filed: Sep. 30, 2015

(65) Prior Publication Data
US 2016/0094942 A1 Mar. 31, 2016

Related U.S. Application Data

(63) Continuation of application No. 13/244,884, filed on Sep. 26, 2011, now abandoned, which is a continuation of application No. 12/954,727, filed on Nov. 26, 2010, now abandoned, which is a continuation of application No. 11/346,280, filed on Feb. 3, 2006, now abandoned.

(51) Int. Cl.
| | |
|---|---|
| *H04W 24/00* | (2009.01) |
| *H04W 4/02* | (2009.01) |
| *G01S 5/00* | (2006.01) |
| *H04M 1/2745* | (2006.01) |
| *H04M 1/725* | (2006.01) |

(52) U.S. Cl.
CPC ............. *H04W 4/02* (2013.01); *G01S 5/0072* (2013.01); *H04M 1/27455* (2013.01); *H04M 1/72544* (2013.01); *H04M 1/72572* (2013.01); *H04M 2250/10* (2013.01)

(58) Field of Classification Search
CPC ....... H04W 64/00; H04W 4/02; H04W 48/04; H04W 4/14; H04L 29/08108; G06Q 10/10; G06Q 10/107; H04M 3/48
USPC ............... 455/414.1, 456.1–456.6, 457, 466; 715/753; 379/210.01; 709/206
See application file for complete search history.

(56) References Cited

U.S. PATENT DOCUMENTS

| | | |
|---|---|---|
| 6,980,813 B2 | 12/2005 | Mohi et al. |
| 7,031,698 B1 | 4/2006 | Appelman |
| 7,110,750 B2 | 9/2006 | Oishi et al. |
| 7,219,303 B2 | 5/2007 | Fish |
| 7,248,880 B2 | 7/2007 | Gheorghiu et al. |
| 7,284,034 B2 | 10/2007 | Matsa et al. |
| 7,308,277 B2 | 12/2007 | Yomoda |
| 7,333,819 B2 | 2/2008 | Caspi et al. |
| 7,403,786 B2 | 7/2008 | Caspi et al. |
| 7,620,404 B2 | 11/2009 | Chesnais et al. |
| 7,689,657 B2 | 3/2010 | Daniell et al. |
| 2002/0115450 A1 | 8/2002 | Muramatsu |

*Primary Examiner* — Steve D Agosta
(74) *Attorney, Agent, or Firm* — Fish & Richardson P.C.

(57) ABSTRACT

A method for visually representing information on a display of a portable electronic device includes receiving location coordinates from at least one other portable electronic device, plotting a visual identifier on a map and displaying the map on the display of the portable electronic device. The position of the visual identifier corresponds to the location coordinates received from the at least one other portable electronic device, which correspond to an actual location of the at least one other portable electronic device. The appearance of the visual identifier is selected to depict the status of the user of the at least one other portable electronic device.

15 Claims, 3 Drawing Sheets

VISUAL REPRESENTATION OF CONTACT LOCATION

CROSS-REFERENCE TO RELATED APPLICATION

This is a continuation of U.S. patent application Ser. No. 13/244,884 filed Sep. 26, 2011, which is a continuation of U.S. patent application Ser. No. 12/954,727 filed Nov. 26, 2010, which is a continuation of U.S. patent application Ser. No. 11/346,280 filed Feb. 3, 2006, in which all are hereby incorporated by reference.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

FIELD

The present specification relates to a mapping application, in particular, a mapping application for visually representing location information.

BACKGROUND

Mapping software is widely used to provide a user with a visual location on a map that corresponds to a street address. MapQuest and Google each offer free access to their mapping software over the internet. In addition to using the mapping software to plot various addresses, it is also known to integrate the mapping software into other applications. One example of this is a real estate application in which multiple identifiers are plotted on a map of a particular city. In this case, each identifier visually represents a property that is for sale or for rent. By selecting an identifier, additional information about the property may be displayed, including contact information for the real estate agent associated with that property.

There are many applications that may be suitable for integration with mapping software. In each case, however, the plotted item is limited to being a building, a tourist attraction or a restaurant, for example. It is therefore desirable to plot the location of a movable item whose location may change over time.

BRIEF DESCRIPTION OF THE DRAWINGS

The specification will be better understood with reference to the following Figures in which.

DETAILED DESCRIPTION

Figure 1:
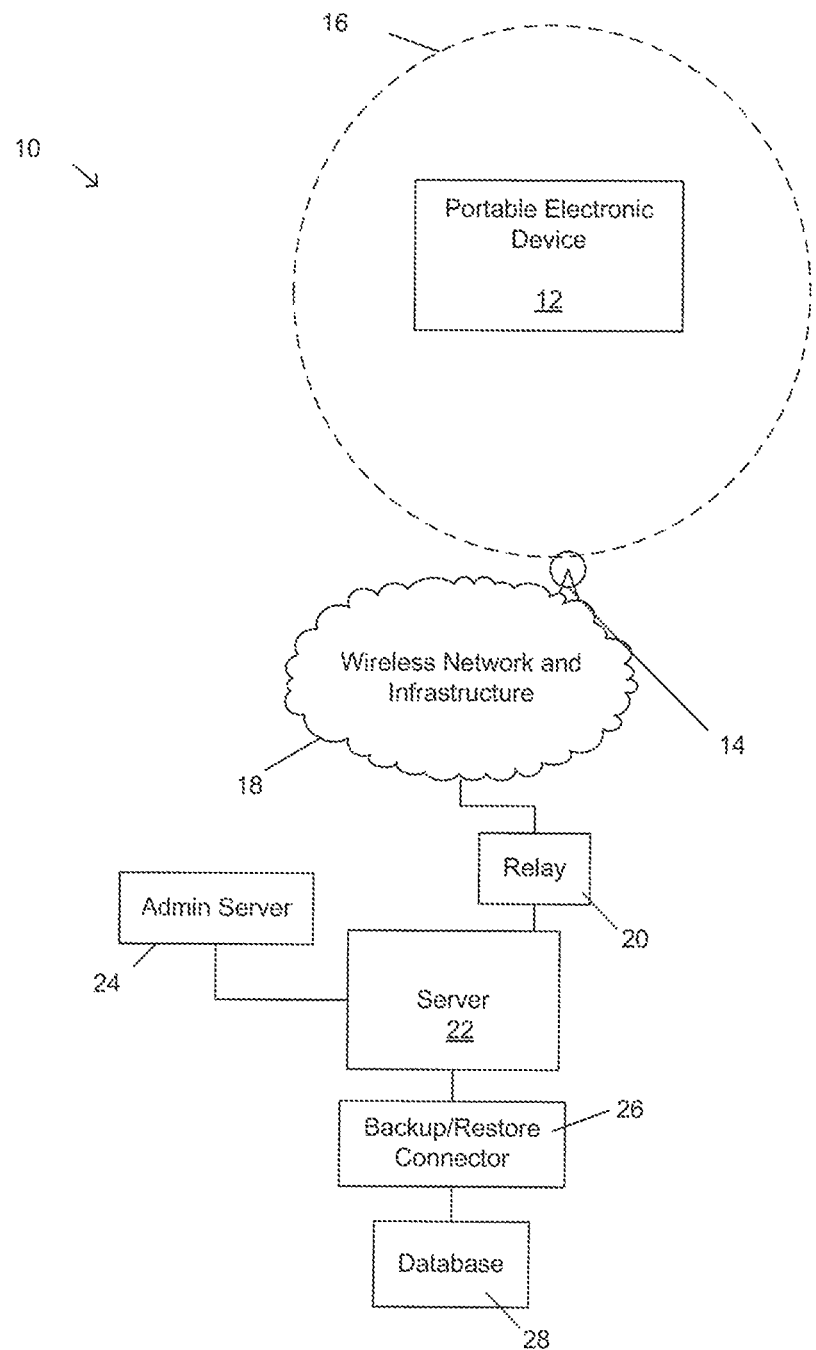
FIG. 1 is a functional block diagram of a communication system for a portable electronic device according to an embodiment.

Referring to FIG. 1, a functional block diagram of a communication system 10 and a portable electronic device 12 is generally shown. The portable electronic device 12 and the communication system 10 are operable to effect communications over a radio communications channel therebetween.

For the purpose of illustration, the communication system 10 is functionally represented in FIG. 1 and includes a base station 14. Base station 14 defines a coverage area, or cell 16 within which communications between the base station 14 and the portable electronic device 12 can be effected. It will be appreciated that the portable electronic device 12 is movable within cell 16 and can be moved to coverage areas defined by other cells, including those that are not illustrated in the present example.

The base station 14 is part of a wireless network and infrastructure 18 that provides a link to the portable electronic device 12. The wireless network and infrastructure 18 includes additional base stations (not shown) that provide the other cells referred to above. Data is delivered to the portable electronic device 12 via wireless transmission from base station 14. Similarly, data is sent from the portable electronic device 12 via wireless transmission to the base stations 14.

Wireless networks and infrastructures include, for example, data-centric wireless networks, voice-centric wireless networks, or dual-mode wireless networks. For the purpose of the present exemplary embodiment, the wireless network and infrastructure 18 includes a dual-mode wireless network that supports both voice and data communications over the same physical base stations.

The communication system 10 further includes a relay device 20 that is connected to the wireless network and infrastructure 18 and to a server 22. It will be understood that the functions provided by the relay device 20 and the server 22 can be embodied in the same device. The server 22 is also connected to an administration server 24, as shown. The administration server 24 provides administrative services to and control over the server 22.

The server 22 is also functionally coupled through a connector 26 to a backup/restore database 28. Other connectors and databases can be provided, for example, for synchronization purposes. The connector 26 receives commands from the server 22. It will be understood that the connector 26 is a functional component and can be provided by way of an application on the server 22. The backup/restore database 28 is used for storing data records, including, for example, copies of Short Message Service (SMS) or Personal Identification Number (PIN) messages sent from the portable electronic device 12.

Figure 2:
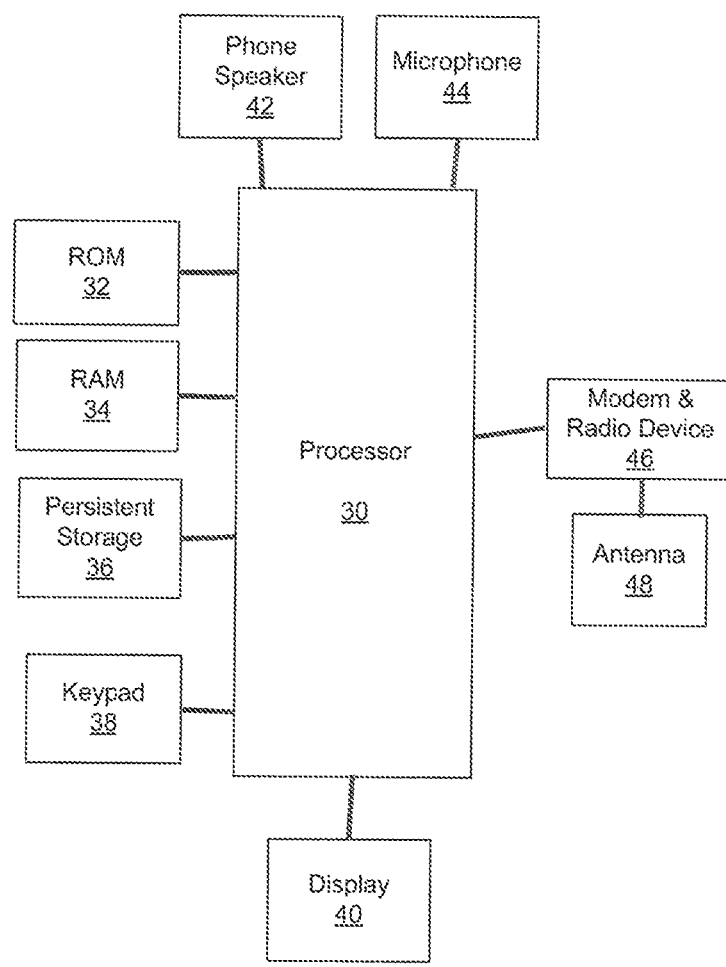
FIG. 2 is a functional block diagram of certain components the portable electronic device of FIG. 1.

Referring now to FIG. 2, a block diagram of certain components within the portable electronic device 12 is shown. In the present embodiment, the portable electronic device 12 is based on the computing environment and functionality of a wireless personal digital assistant (PDA). It will be understood, however, that the portable electronic device 12 is not limited to a wireless personal digital assistant. Other portable electronic devices are possible, such as cellular telephones, smart telephones, and laptop computers. Referring again to the present embodiment, the portable electronic device 12 is based on a microcomputer including a processor 30 connected to a read-only-memory (ROM) 32 that contains a plurality of applications executable by the processor 30 that enables the portable electronic device 12 to perform certain functions including, for example, PIN message functions, SMS message functions and cellular telephone functions. The processor 30 is also connected to a random access memory unit (RAM) 34 and a persistent storage device 36 which are responsible for various non-volatile storage functions of the portable electronic device 12. The processor 30 receives input from various input devices including a keypad 38. The processor 30 outputs to various output devices including an LCD display 40. A microphone 44 and phone speaker 42 are connected to the processor 30 for cellular telephone functions. The processor 30 is also connected to a modem and radio device 46. The modem and radio device 46 is used to connect to wireless networks using an antenna 48. The modem and radio device 46 transmits and receives voice and data communications to and from the portable electronic device 12 through the antenna 48.

The portable electronic device 12 is operable to effect two way communication of voice and data. Thus, the portable electronic device 12 transmits and receives voice and data communications over the wireless network and infrastructure 18 via wireless communications with the base station 14 over a radio communications channel.

Figure 3:
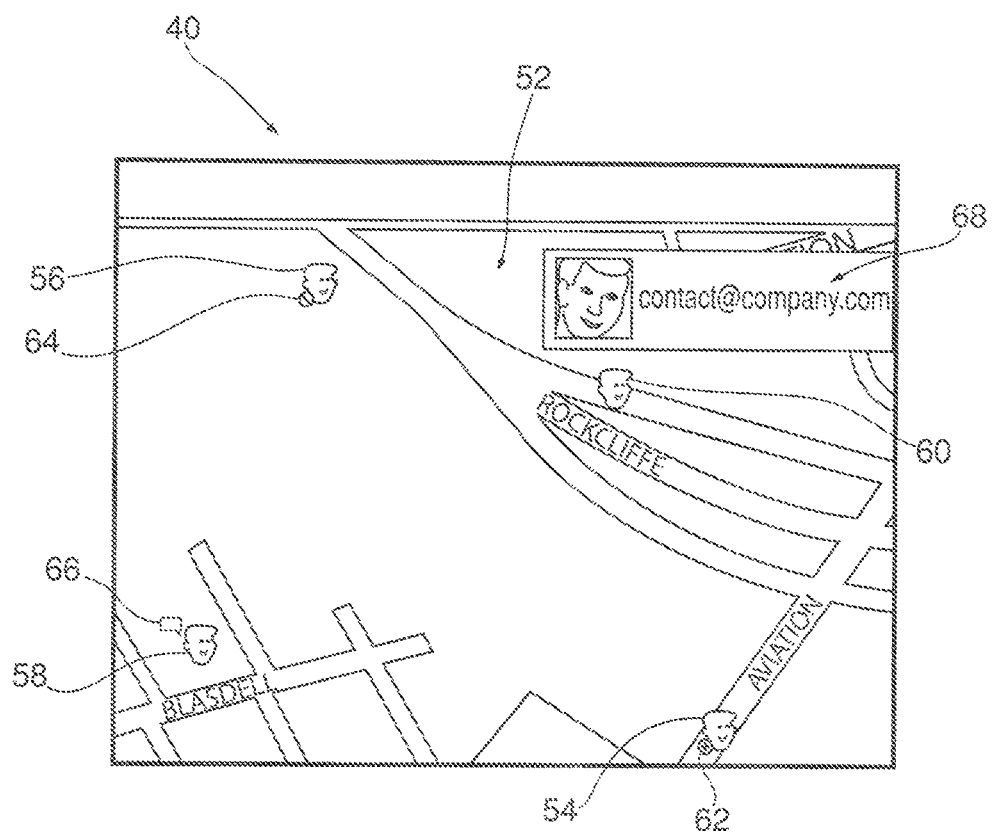
FIG. 3 is a front view of a display of the portable electronic device of FIG. 2.

Referring to FIG. 3, display screen 40 of portable electronic device 12 of a first user, is generally shown. A map 52 appears on the display 40. Avatars 54, 56, 58 and 60, which are located at various positions on the map 52, are also shown on the display 40. Each avatar 54, 56, 58, 60 is a visual identifier that represents a different portable electronic device user.

The map 52 is generated using a mapping software application, which uses mapping software to provide worldwide map data. The worldwide map data may be provided by NAVTEQ, Tele Atlas or another provider.

The position at which each avatar 54, 56, 58, 60 is plotted on the map 52 corresponds to the global location coordinates of each user's portable electronic device at a particular time. The location coordinates are determined locally in each portable electronic device using Global Positioning System (GPS) technology that is integrated into each portable electronic device. The location coordinates may alternatively be determined locally based on signal strength from cell towers, for example, or any other suitable type of positioning technology. Further, it will be appreciated by those skilled in the art that if a user's portable electronic device does not support GPS technology, the user may manually input location information into the portable electronic device.

Once the location coordinates have been determined locally, the coordinates are sent to the portable electronic device 12 of the first user, whose display 40 is shown in FIG. 3. The coordinates may be sent following a request from the first user or at regular intervals without a request from the first user. Alternatively, the coordinates may be sent every time there is a change in the coordinates.

The status of each user is also visually represented on the display 40. As shown, avatar 54 is grayed out and includes a picture of a bee 62 to indicate that the user associated with this avatar 54 is busy; avatar 56 is grayed out and includes a picture of a do not disturb sign 64 to indicate that the user is not available; avatar 58 includes a picture of a callout 66 to indicate that the user is typing a message and avatar 60 is available. The status of each user is determined locally using algorithms on the portable electronic device. Determining the status of a portable electronic device user is well known in the art. For example, a user's status may be determined to be unavailable if the user does not respond to active notifications, which include emails, calendar events and instant messages, for a predetermined period of time.

Similar to the location coordinates, the status may be sent to the first user following a request from the first user, at regular intervals, or every time there is a change in the user status. The status information is generally sent to the portable electronic device of the first user at the same time as the location information, however, may alternatively be sent at a different time.

The portable electronic device users that are displayed on the map 52 are members of a contact list of the first user. The first user is authorized to receive and view information about each member and therefore is a member of the contact list of each of the other users. Similarly, the other users are authorized to receive and view information about the first user. The authorization process between a pair of portable electronic device users is well known in the art and therefore will not be described here.

The contact list is divided into a number of groups. The first user may not want to display the location of every contact in his/her contact list all of the time so it is possible to select one or more groups to display. For example, one group may be called "Project Leaders" and contain only those colleagues who are in charge of projects. It may be useful to plot only this group on a map in order to determine their respective locations at the time a meeting is scheduled to start. Similarly, other groups may be created and plotted on a map.

The information that is stored in the contact list with respect to a particular user typically includes: email address, phone number(s), facsimile number(s) and physical address (es). A profile including a preferred avatar of the contact may also be stored with the contact information.

The contact list is not limited to including only contacts who have completed an authorization process. Contacts for whom location and status information cannot be obtained may also be included on the contact list. In addition, if a user who is an authorized contact of the first user does not wish to have his/her location or status made available at a particular time, the user may block transmission of such information, if desired.

The first user is able to view additional information associated with an avatar 54, 56, 58, 60 by focusing on the avatar 54, 56, 58, 60 using a mouse or other selection device. As shown in FIG. 3, avatar 60 is "in focus". This launches a window 68 that provides additional information from the contact list about the contact. In this case, a photograph and email address is provided, however, other information may alternatively be provided.

In use, the first user powers up portable electronic device 12 if it is not already powered up. The user then selects a group of contacts from a list of predefined groups that is provided. Following selection of the desired group, a location and status request is sent from the first user's portable electronic device to the portable electronic devices of each member of the selected group. When the requested information has been received, a map 52 is presented on the display 40 including the avatars 54, 56, 58, 60 of the respective contacts as shown in FIG. 3. As previously described, the location and status may alternatively be broadcast from the portable electronic devices of the other users and received by the portable electronic device of the first user without a request.

Once the avatars 54, 56, 58, 60 have been plotted on the map 52, the first user may focus on any one of the avatars 54, 56, 58, 60 to bring up window 68, which includes further information associated with the avatar 54, 56, 58, 60.

The map 52 may be maintained on the display 40 at all times or alternatively, the map 52 may be launched each time the first user selects a "Map my Contacts" application from a menu. In the embodiment in which the map 52 is maintained on the display 40, the location coordinates and status are updated at regular intervals. The timing of the intervals may be set by the portable electronic device 12 of the first user. Alternatively, the location coordinates and status may only be updated when the first user clicks a "refresh" button.

In another embodiment, the avatars 54, 56, 58, 60 are replaced with customized avatars that are easily differentiable from one another. One type of customized avatar is a photograph of the respective user. The customized avatars may be associated with each user's profile. Alternatively, avatars may be assigned by the first user to override the avatars associated with the user profiles.

The status of a user may be represented in various ways. For example, if the avatar is a photograph of the user, a busy status may be indicated by graying out the photograph; a not available status may be indicated by drawing an X over the photograph, a typing status may be indicated by coloring the photograph yellow or another suitable color; and an available status may be indicated by simply displaying the original photograph. It will be appreciated by persons skilled in the art that other types of status may also be visually represented. For example, if a user has manually set their portable electronic device to "do not disturb" this may be represented in a different manner than a user who has simply not responded to calls or electronic messages for a period of time.

It will be appreciated that the location and status information of the other users is displayed on the map 52 regardless of the actual distance between the other users and the first user. As long as the portable electronic device 12 of the first user is able to receive signals from the other users, the information will be displayed.

A specific embodiment has been shown and described herein. However, modifications and variations may occur to those skilled in the art. For example, although only a small number of avatars have been described, there are many types of avatars for differentiating users from one another and for indicating the status of each user that could be used. In addition, the map 52 that appears on the display 40 may be drawn from location source data using vector graphics. Other modifications and variations may occur to those skilled in the art. All such modifications and variations are believed to be within the sphere and scope of the present embodiment.

What is claimed is:

1. A device comprising:
a processor, a display device, a communication interface and a memory storing a contact list comprising one or more groups and storing meeting data associated with a given group of the one or more groups, the meeting data including a meeting start time, the processor configured to:
receive, using the communication interface, respective locations of a plurality of portable electronic devices and respective status data associated with the plurality of portable electronic devices, wherein each of the plurality of plurality of portable electronic devices are associated with the given group in the contact list stored in the memory;
process the respective status data to distinguish between manually set status data and automatically set status data, wherein the manually set status data is indicative of a respective portable electronic device being manually set to a status; and,
render, at the display device, a map comprising:
respective visual identifiers at respective positions corresponding to the respective locations of each of the plurality of portable electronic devices; and,
respective indicators of the respective status data adjacent the respective visual identifiers, a first subset of the respective indicators comprising a first indicator indicative that the respective status data associated with the first subset was manually set, and a second subset of the respective indicators comprising a second indicator indicative that the respective status data associated with the second subset was automatically set; and,
at the meeting start time, render the respective visual identifiers and the respective indicators on the map only for the plurality of portable electronic devices associated with the given group.

2. The device of claim 1, wherein the automatically set status data is indicative of a respective portable electronic device being unresponsive to one or more of calls and messages.

3. The device of claim 1, wherein the automatically set status data is indicative of a respective portable electronic device being unresponsive to one or more of calls and messages for a given period of time.

4. The device of claim 1, wherein the processor is further configured to filter the respective locations of the plurality of portable electronic devices and the respective status data associated with the plurality of portable electronic devices according to the given group of the one or more groups; and render the respective visual identifiers and the respective indicators on the map only for the plurality of portable electronic devices associated with the given group.

5. The device of claim 1, wherein processor is further configured to, at the meeting start time, render, at the map, only the respective visual identifiers and the respective indicators of the plurality of portable electronic devices associated with a respective meeting.

6. A method comprising:
at a device comprising: a processor, a display device, a communication interface and a memory storing a contact list comprising one or more groups and storing meeting data associated with a given group of the one or more groups, the meeting data including a meeting start time, receiving, at the processor, using the communication interface, respective locations of a plurality of portable electronic devices and respective status data associated with the plurality of portable electronic devices;
processing, at the processor, the respective status data to distinguish between manually set status data and automatically set status data, wherein the manually set status data is indicative of a respective portable electronic device being manually set to a status; and,
rendering, at the display device, a map comprising:
respective visual identifiers at respective positions corresponding to the respective locations of each of the plurality of portable electronic devices; and,
respective indicators of the respective status data adjacent the respective visual identifiers, a first subset of the respective indicators comprising a first indicator indicative that the respective status data associated with the first subset was manually set, and a second subset of the respective indicators comprising a second indicator indicative that the respective status data associated with the second subset was automatically set; and,
at the meeting start time, rendering the respective visual identifiers and the respective indicators on the map only for the plurality of portable electronic devices associated with the given group.

7. The method of claim 6, wherein the automatically set status data is indicative of a respective portable electronic device being unresponsive to one or more of calls and messages.

8. The method of claim 6, wherein the automatically set status data is indicative of a respective portable electronic device being unresponsive to one or more of calls and messages for a given period of time.

9. The method of claim 6, further comprising: filtering the respective locations of the plurality of portable electronic devices and the respective status data associated with the plurality of portable electronic devices according to the given group of the one or more groups; and rendering the respective visual identifiers and the respective indicators on the map only for the plurality of portable electronic devices associated with the given group.

10. The method of claim 6, further comprising, at the meeting start time, rendering, at the map, only the respective visual identifiers and the respective indicators of the plurality of portable electronic devices associated with a respective meeting.

11. A non-transitory computer-readable medium storing a computer program, wherein execution of the computer program is for:
at a device comprising: a processor, a display device, a communication interface and a memory storing a contact list comprising one or more groups and storing meeting data associated with a given group of the one or more groups, the meeting data including a meeting start time, receiving, at the processor, using the communication interface, respective locations of a plurality of portable electronic devices and respective status data associated with the plurality of portable electronic devices;
processing, at the processor, the respective status data to distinguish between manually set status data and automatically set status data, wherein the manually set status data is indicative of a respective portable electronic device being manually set to a status; and,
rendering, at the display device, a map comprising:
respective visual identifiers at respective positions corresponding to the respective locations of each of the plurality of portable electronic devices; and,
respective indicators of the respective status data adjacent the respective visual identifiers, a first subset of the respective indicators comprising a first indicator indicative that the respective status data associated with the first subset was manually set, and a second subset of the respective indicators comprising a second indicator indicative that the respective status data associated with the second subset was automatically set; and,
at the meeting start time, render the respective visual identifiers and the respective indicators on the map only for the plurality of portable electronic devices associated with the given group.

12. The non-transitory computer-readable medium of claim 11, wherein the automatically set status data is indicative of a respective portable electronic device being unresponsive to one or more of calls and messages.

13. The non-transitory computer-readable medium of claim 11, wherein the automatically set status data is indicative of a respective portable electronic device being unresponsive to one or more of calls and messages for a given period of time.

14. The non-transitory computer-readable medium of claim 11, further comprising filtering the respective locations of the plurality of portable electronic devices and the respective status data associated with the plurality of portable electronic devices according to the given group of the one or more groups; and rendering the respective visual identifiers and the respective indicators on the map only for the plurality of portable electronic devices associated with the given group.

15. The non-transitory computer-readable medium of claim 11, further comprising, at the meeting start time, rendering, at the map, only the respective visual identifiers and the respective indicators of the plurality of portable electronic devices associated with a respective meeting.

\* \* \* \* \*

UNITED STATES PATENT AND TRADEMARK OFFICE
CERTIFICATE OF CORRECTION

PATENT NO. : 9,668,092 B2  
APPLICATION NO. : 14/870355  
DATED : May 30, 2017  
INVENTOR(S) : Gerhard Dietrich Klassen, Shaul S. Wisebourt and Samer Fahmy Page 1 of 1

It is certified that error appears in the above-identified patent and that said Letters Patent is hereby corrected as shown below:

In the Specification

Column 5, Line 56: In Claim 1, delete "plurality of plurality of" and insert -- plurality of --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*